(12) United States Patent
Priyantha et al.

(10) Patent No.: US 10,863,098 B2
(45) Date of Patent: Dec. 8, 2020

(54) MULTIMODAL IMAGE SENSING FOR REGION OF INTEREST CAPTURE

(71) Applicant: Microsoft Technology Licensing, LLC, Redmond, WA (US)

(72) Inventors: Nissanka Arachchige Bodhi Priyantha, Redmond, WA (US); Matthai Philipose, Seattle, WA (US); Stephen Edward Hodges, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 206 days.

(21) Appl. No.: 13/923,098

(22) Filed: Jun. 20, 2013

(65) Prior Publication Data

US 2014/0375820 A1 Dec. 25, 2014

(51) Int. Cl.
*H04N 5/232* (2006.01)
*H04N 7/18* (2006.01)
(Continued)

(52) U.S. Cl.
CPC ....... *H04N 5/23296* (2013.01); *H04N 5/2258* (2013.01); *H04N 5/23241* (2013.01);
(Continued)

(58) Field of Classification Search
CPC ............. H04N 13/025; H04N 13/0253; H04N 2209/048; H04N 5/2258; H04N 5/23241; H04N 5/23296; H04N 5/332; H04N 7/188
(Continued)

(56) References Cited

U.S. PATENT DOCUMENTS 7,961,906 B2 *   6/2011 Ruedin ................ G06K 9/6289
                                                    382/103
2003/0063093 A1 * 4/2003 Howard ................... G06T 7/20
                                                    345/581
(Continued)

FOREIGN PATENT DOCUMENTS

CA       2364564 A1    6/2003
CN       101682694 A   3/2010
CN       201947367 U   8/2011

OTHER PUBLICATIONS

"International Search Report & Written Opinion Issued in PCT Application No. PCT/US2014/042787", dated Sep. 30, 2014, 12 Pages.

(Continued)

*Primary Examiner* — James T Boylan

(57) ABSTRACT

An imaging sensor system includes a control system that helps save energy, computing, and communication resources by capturing evaluation images with a gating image sensor and processing the evaluation images to determine whether there is a region of interest (ROI) present that warrants capturing a subsequent image with a gated image sensor for additional image processing. That is, the gating image sensor and preliminary processing operates as a gate for turning on the gated sensor for the additional image capturing and processing. The additional image captured by the gated sensor may include only the ROI, which is provided to an image processing algorithm for further image processing. In addition, a gating sensor may include infrared sensing to help determine whether the ROI includes thermal data indicative of human features.

20 Claims, 7 Drawing Sheets

(51) Int. Cl.
  *H04N 5/369* (2011.01)
  *H04N 13/25* (2018.01)
  *H04N 13/271* (2018.01)
  *H04N 5/33* (2006.01)
  *H04N 13/254* (2018.01)
  *H04N 5/225* (2006.01)

(52) U.S. Cl.
  CPC ........... *H04N 5/332* (2013.01); *H04N 5/3696* (2013.01); *H04N 7/188* (2013.01); *H04N 13/25* (2018.05); *H04N 13/254* (2018.05); *H04N 13/271* (2018.05); *H04N 2209/048* (2013.01)

(58) Field of Classification Search
  USPC ......................................................... 348/164
  See application file for complete search history.

(56) References Cited

U.S. PATENT DOCUMENTS

| | | | | |
|---|---|---|---|---|
| 2006/0139470 | A1* | 6/2006 | McGowan | H04N 3/155 348/294 |
| 2007/0236497 | A1* | 10/2007 | Kondo | G05B 15/02 345/440 |
| 2010/0289885 | A1 | 11/2010 | Lu et al. | |
| 2011/0115886 | A1* | 5/2011 | Nguyen | H04N 13/025 348/47 |
| 2011/0216210 | A1* | 9/2011 | Hao | G06T 3/4053 348/222.1 |
| 2011/0221599 | A1* | 9/2011 | Hogasten | H01L 27/14609 340/632 |
| 2012/0105193 | A1* | 5/2012 | Gritti | H05B 47/105 340/3.4 |
| 2012/0326959 | A1* | 12/2012 | Murthi | G06F 3/005 345/156 |
| 2012/0327218 | A1* | 12/2012 | Baker | H04N 5/23212 348/135 |
| 2013/0076910 | A1* | 3/2013 | Scott | 348/164 |
| 2014/0168056 | A1* | 6/2014 | Swaminathan | G06K 9/00604 345/156 |

OTHER PUBLICATIONS

"Office Action Issued in European Patent Application No. 14744215.6", dated Oct. 16, 2017, 6 Pages.
"First Office Action and Search Report Issued in Chinese Patent Application No. 201480035334.0", dated Dec. 4, 2017, 14 Pages.
"Second Office Action Issued in Chinese Patent Application No. 201480035334.0" dated Aug. 3, 2018, 11 Pages.
"Third Office Action and Search Report Issued in Chinese Patent Application No. 201480035334.0", dated Jan. 23, 2019, 13 Pages.

* cited by examiner

MULTIMODAL IMAGE SENSING FOR REGION OF INTEREST CAPTURE

BACKGROUND

In continuous (e.g., mobile) vision systems, an image sensor system continuously monitors the environment to detect and capture interesting events, such as when human faces appear in the image. In this way a device is able to take some automated action on behalf of its user, such as identifying a person with whom a conversation is being held, or identifying an object a person is holding.

Conventional imaging solutions continuously capture frames of images and transmit these frames to an image processor, which uses image processing algorithms to identify the events of interest. Such conventional solutions to continuous mobile vision systems thus capture a continuous stream of high quality sequential images as a video, and process the images to identify such events. However, capturing, transmitting, and processing a continuous stream of high quality images incurs a heavy energy overhead cost that can quickly drain a camera/device battery.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology in which a gating (e.g., lower-resolution and/or lower power) image sensor and preliminary processing acts as a gate for turning on one or more other gated sensors for further processing. In one aspect, first data of a first set of pixels corresponding to an evaluation image is processed to determine whether a region of interest is predicted to exist within the image. If so, at least one other gated sensor array is controlled, including controlling each other sensor array to obtain another (e.g., higher resolution) image that comprises the region of interest. If the gated sensor array is one that captures a high-resolution image, for example, second data including the region of interest is provided to an image processor, in which the second data provided to the image processor may correspond to less than a full image.

In one aspect, a first sensor array is configured to capture evaluation images used for making gating decisions, and a second sensor array is configured to capture other, e.g., higher-resolution and/or otherwise different images. A controller processes an evaluation image to determine if one or more region-of-interest criteria are met, including whether a region of interest is present within the lower-resolution image. If the one or more region-of-interest criteria are met, the controller controls the second sensor to capture another image for providing a region of interest to an image processor. In one aspect, the one or more region-of-interest criteria include whether thermal data indicates one or more human features are within the image.

One technology aspect described herein includes capturing an evaluation image via a gating sensor, and processing the evaluation image to determine whether the evaluation image likely corresponds to an event of interest, and if not, returning to again capture another evaluation image, e.g., at a suitable frame rate.

If the evaluation image corresponds to an event of interest, further described is determining whether human feature detection is active; (if not, another image is captured based upon the evaluation image likely corresponding to an event of interest). If human feature detection is active, an infrared image from which temperature data is determinable is captured and processed to determine whether the temperature data indicates one or more human features; if not, described is returning to again capture an evaluation image.

If the evaluation image likely corresponds to an event of interest, (and when human feature detection is active, human features are detected), another image set is captured. At least part of an image from the set is provided to an image processor.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a relatively low energy/power solution to capture only interesting images, and/or process only the portions of regions of interest in images, that is, portions of images containing interesting visual events. In one aspect, a combination of multimodal sensors may be used to identify whether an interesting event is occurring, and if so, capture one or more regions of interest for visual event detection.

As one example, energy-efficient region of interest detection and capture may be provided using multimodal sensors, in which lower power sensors are used to "gate" higher power sensors. Multiple sensing modalities may be used, such as based upon a low-power, low-resolution narrow depth-of field sensor, a low-power far infrared sensor, and/or a high-resolution image sensor with multi-resolution and energy proportional windowing capability. For example, the narrow depth of field sensor may detect activity, far infrared sensors may detect the presence of human features, and an image sensor with a windowing feature may be used to capture the region-of-interest within the image. Because the high-resolution image sensor only operates when the other sensor or sensors indicate there is interesting activity to detect, power is saved. Further, the widowing capability results in less data than the full image being transmitted and processed, whereby this aspect of the system also operates in an energy efficient way.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and imaging technology in general.

Figure 1:
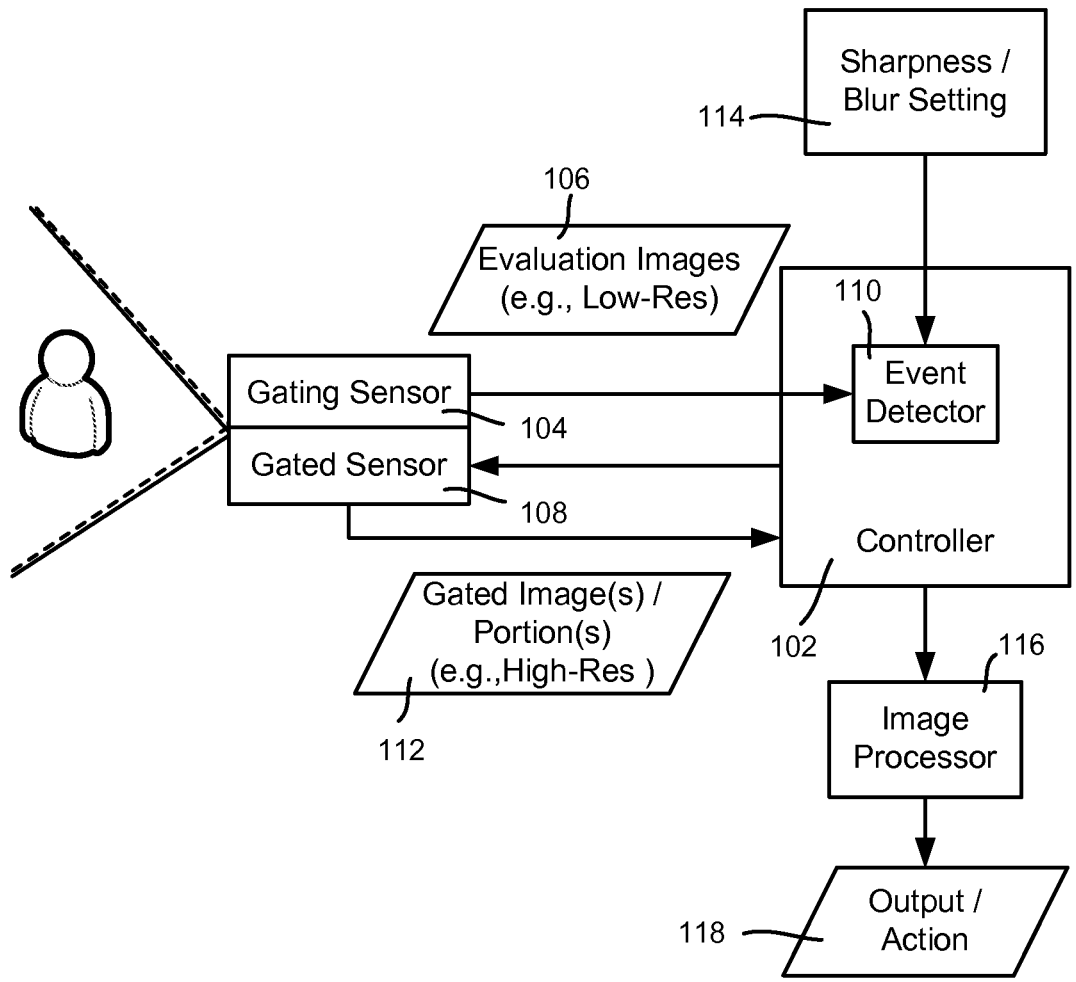
FIG. 1 is a block diagram showing various example components including controllable image sensor circuitry that provides for multimodal image sensing for region of interest capture, according to one example embodiment.

FIG. 1 is a block diagram showing example concepts of technology aspects described herein. A controller 102 (e.g., a microcontroller running in a low-power mode or a low-power custom ASIC) controls a gating sensor 104 to capture evaluation images 106. As described herein, the evaluation images 106 are received at the controller 102 for general processing to determine whether an evaluation image indicates an event of interest. In the example of FIG. 1, an event detector 110 may make such a determination, however other types of detectors may be used including those exemplified herein.

If a region of interest is detected, a gated sensor 108 (having an overlapping field of view with the gating sensor 104) is controlled to capture another (gated) image set 112 comprising the full image or one or more image portions. The image set is sent to an image processor 116 for processing as described below.

Thus, a gating sensor's evaluation data is processed to determine whether a subsequent gated sensor is to be activated. There may be a series of such sensors, e.g., a gated sensor may be used as a gating sensor for a subsequent gated sensor, and so on. The sensors have overlapping fields of view, but the gating sensors capture evaluation images, such as to find regions of interest (people, foreground objects, moving objects) in the field of view using less energy than finding these regions using information from the gated sensor or sensors alone.

There are many possible types of gating sensors. A typical scenario is to use a lower-resolution sensor as a gating sensor for a higher-resolution gated sensor, e.g., an IR, color and/or monochrome sensor. In general, because fewer pixels are involved, the lower-resolution sensor uses significantly less power than a higher-resolution sensor. Examples of low-resolution sensors combined in various ways with high-resolution sensors to capture substantially the same field-of-view are described below with reference to FIGS. 4, 5A and 5B.

Note that gating need not be based upon different resolutions. For example, a 640×480 far infrared (FIR/thermal) sensor may be used for gating a 640×480 RGB sensor to find faces. The FIR sensor, by performing a simple threshold test at every pixel on body temperature, may substantially reduce the amount of processing needed for finding possible faces. The FIR sensor is thus able to find regions of (possible) interest with very little processing.

A FIR camera may be used to detect a possible region of interest for gating a higher-power/higher-resolution depth sensor to get more relevant data. Note that in active illumination scenarios, the region of active illumination may be based upon the region of interest to save power.

Other gating combinations are feasible. A regular RGB camera at a low resolution may be used as a gating sensor for a depth sensor. Passive stereo sensing may be used to get lower resolution depth data, which may gate capturing higher-resolution depth data from an active illumination system. Resolution may be defined by X and Y, and in suitable scenarios by depth.

Passive RGB or near IR imaging may be used to determine whether to turn on active illumination to get "better" images (where "better" may refer to higher dynamic range/less noisy data rather than higher resolution pixels per area in this example). Note that "resolution" is not necessarily pixel size/number of pixels per array, but also may represent concepts such as bits-per-pixel, color depth (for an image sensor) and so on.

Depth sensing (e.g., with low power depth sensors) may be used to gate RGB sensors, or vice-versa (given low power RGB interest detection and higher power depth sensing. Passive depth sensing may be used to gate active illumination depth sensing, or passive RGB sensing may be used to gate active illumination RGB sensing with better color depth, and so forth. 3-D sensors may be gating or gated sensors depending on their use, e.g., a 3-D point cloud may be gated with FIR sensors to separate people from non-people within the point cloud, for example. A high-resolution image may be gated using a 3-D point cloud.

For purposes of brevity hereinafter, many of the examples refer to using a lower-resolution sensor as a gate for a higher-resolution sensor, with possibly intervening gating. Notwithstanding, it is understood that any of the above combinations as well as others are feasible.

Thus, in FIG. 1 the gating sensor 104 may be a low-resolution sensor relative to the gated sensor 108. In general, the low-resolution sensor may be used to identify changes in the scene where the "depth" of region of interest is defined by the depth of field of the optical system. The optical system may use a static configuration when the region of interest is at a fixed depth from the image sensor system (e.g., used for detecting the presence of an individual when identifying the conversation partner using a body-worn image sensor accessory). The optical system may be dynamic (having a moving lens or sensor, for example) for scanning multiple regions-of-interest at different depths from the image sensor (e.g., a "narrow depth-of-field sensor").

Region of interest detection may be accomplished via edge detection and/or based upon whether there is significant change relative to some previous image or set of images that may indicate an event, for example. By way of a more particular example, consider that a user has set a device to capture and process interesting events that are close to the device/sensor, but not those in the background. Over two or more frames, distant events tend to be blurred whereas close events tend to be sharper. Thus, frame subtraction (e.g., in the event detector 110) evaluated against blur/sharpness settings 114 (e.g., a configured threshold value) may be used to roughly approximate whether some event may be occurring close to the sensor, as well as where within the image the possible event is detected. Such settings such as the threshold value may be user configurable, e.g., a user interested in detecting nearby people has a different objective than a security camera monitoring an entire room or similar space.

If a possible event is detected, the event detector 110, shown as part of the controller 102 (but alternatively coupled thereto) causes the controller 102 to activate the gated (e.g., higher-resolution) sensor 108 to capture a high-resolution image as the gated image set 112. Note that a full image may be captured, or, depending on whether different parts of the high-resolution sensor may be independently activated (e.g., via the implementation of FIG. 5B), only the portion or portions of the image that contain a region of interest, e.g., as determined by the event detector 110, may be captured.

Thus, a gated image sensor 108, possibly with multi-resolution and windowing capability may be used to capture a relatively high-quality image of the region of interest for further image processing, such as for face and object recognition. In one implementation, a windowing feature, in which only the pixels within a specified region of the image are read out, reduces the energy consumption. Energy is saved because the system components (e.g., the image sensor, the image processor reading and interpreting the image data, as well as the communication channel) are turned on for a shorter time relative to reading the full image. For another, the image sensor may have built-in energy-proportional features (e.g., as described in U.S. patent application Ser. No. 13/770,031 hereby incorporated by reference) in which the energy spent by the image sensor capturing the image is generally/approximately proportional to the number of pixels read out.

The gated image 112 may be processed by an image processor 116. In FIG. 1 this is shown as separate from the controller 102, but may be incorporated as part of the controller 102. Note that alternatives are feasible, depending on whether a full image or only portions thereof were captured.

One alternative is that the full image is captured, in which event the controller 102 may crop the full high-resolution image into one or more relevant "windowed" portions. Another alternative is that the gated sensor is controllable to only capture the one or more specified windowed portions. In any event, because of the windowing technique, less than the full image may be transmitted to and/or processed by the image processor, thereby providing energy savings.

These lesser amounts of data, if available, are thus processed by an internal image processor or sent to an external image processor for further image processing, e.g., facial recognition, object recognition, and/or the like. Thus, also represented in FIG. 1 is output by the image processor 116, corresponding to some action/output 118. For example, a user may be subtly told (e.g., audibly and/or visibly in some way) the name of a person who is in view, or what an object is, possibly in a different language. The image processing may be used to trigger a video recording of a sequence of high-resolution images, e.g., the user may have instructed a device to start high-resolution video recording whenever the user's daughter is in view, or whenever any person is detected in view (e.g., for security systems). Virtually any action may be taken depending on the application that is using the image data.

In this way, a combination of different types of image sensors with different sensing capabilities and power consumption numbers detect the occurrence of interesting events. Further, the technology estimates the location of an interesting event in the view of the image sensor, such that the image sensing system may only capture, transmit, and process only regions-of-interest of the images.

Figure 2:
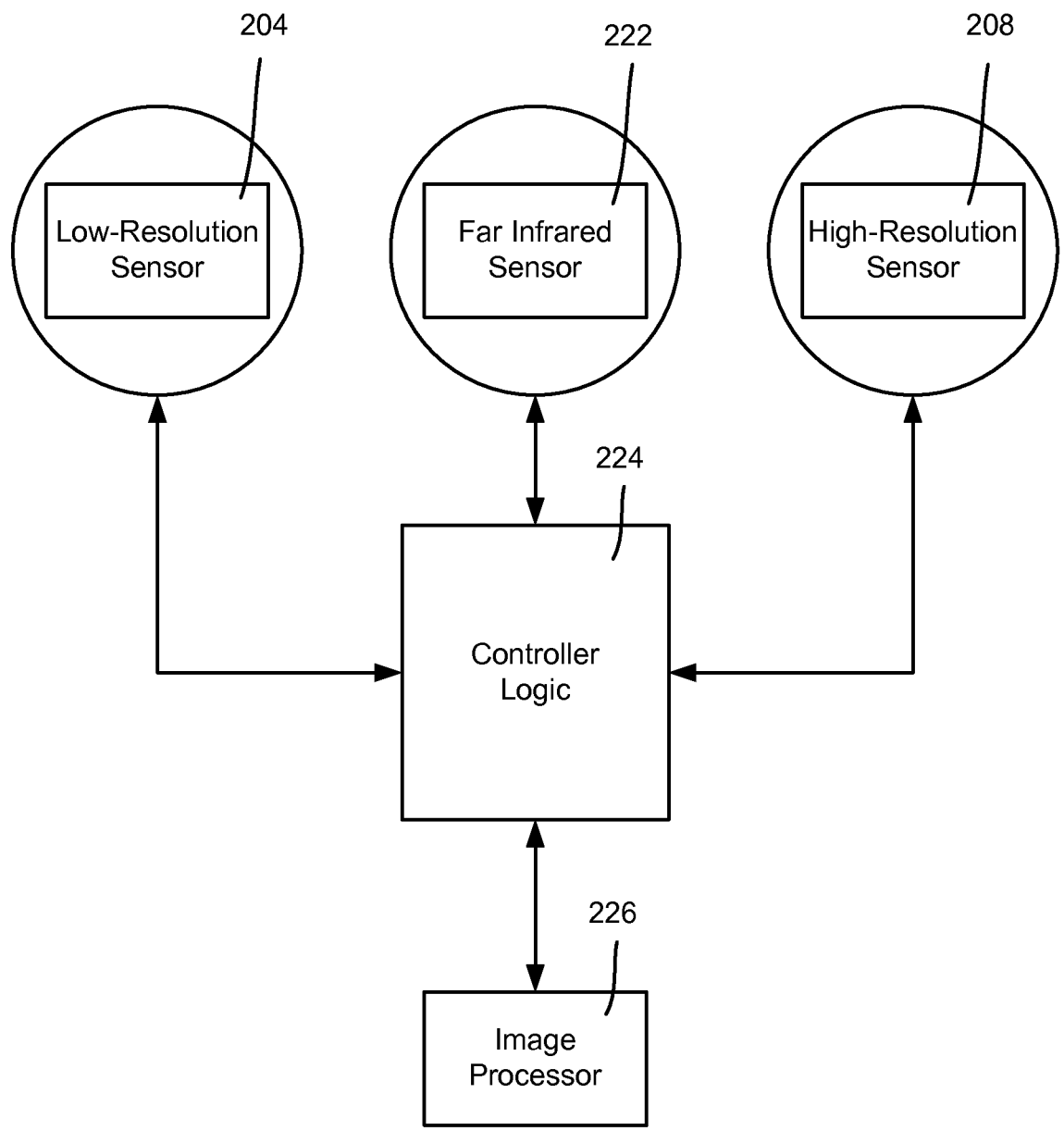
FIG. 2 is a block diagram showing how multiple sensors may be controlled to capture a region of interest for local device image processing, according to one example embodiment.
Figure 3:
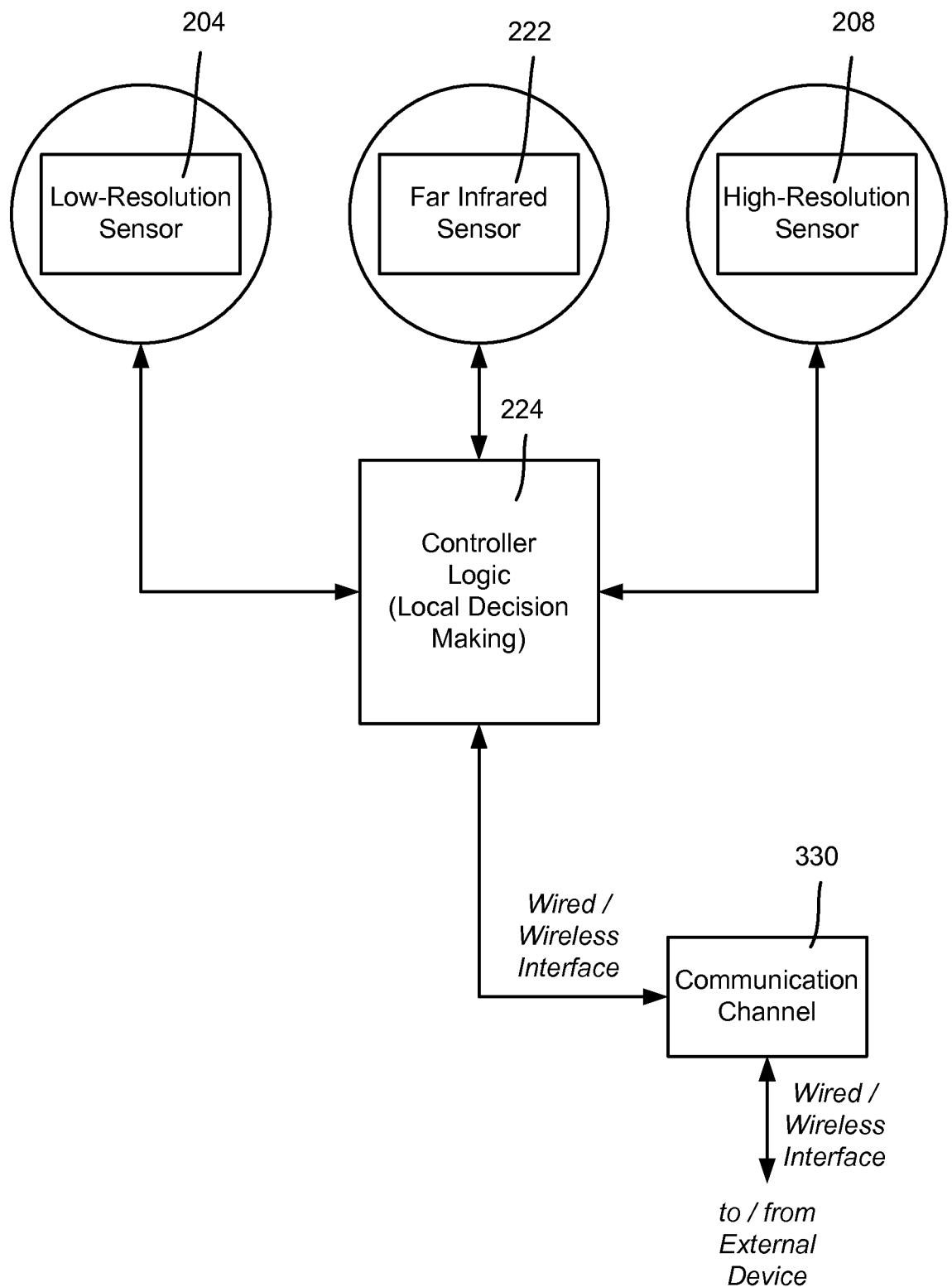
FIG. 3 is a block diagram showing how multiple sensors may be controlled to capture a region of interest for remote device image processing, according to one example embodiment.

FIGS. 2 and 3 show implementations having an additional sensor 222, comprising a low-power, low-resolution far infrared image sensor, for example. The low-power, low-resolution far infrared image sensor 222 may be used for detecting the presence of human features (e.g., faces for conversation partner identification, or hands for hand-held object identification) within the region of interest. One implementation is based on low-response time, low-power thermopile-based far infrared image sensors in which object temperatures can be measured accurately.

In these example implementations, controller logic 224 manages and accesses the sensors 204, 208 and 222. An image processor 226 may be local, e.g., in the same device as the sensors 204, 208 and 222 and controller logic 224, or a (wired or wireless) communication channel 330 may be used (FIG. 3), such as to send the image data to an external processor.

The first gating sensor, which in this example is a low-resolution sensor 204 (low-power, narrow depth-of-field sensor), may operate continuously at a specified frame rate for identifying changes in the visual field of the sensing system at the desired depth region or regions. The other sensors 222 and 208 are turned off (or in a very low-power sleep state). The data from the low-resolution sensor 204 is regularly analyzed using techniques such as edge detection by the controller logic 224 to detect changes in the visual field.

In this example, consider that the user has configured his device to sense human features. Thus, when a change is detected from low-resolution image sensing and processing, the infrared sensor 222 is turned on to detect the presence/changes of human features based on the human body temperature. For example, low-resolution thermopile sensor array data may be processed by the controller logic 224 to identify a region-of-interest within the scene based upon temperatures indicative of human features. It is feasible that no human features are detected, however for purposes of this example, assume that one or more human features are thermally sensed.

The high-resolution sensor 208 is then turned on. Depending on whether the high-resolution sensor 208 is capable of windowing, the region or regions-of-interest identified from the infrared sensor's array are captured (if capable of windowing), or the full image is captured (if not capable) and cropped into the relevant region or regions. The region or regions are then sent for image processing.

Figure 4:
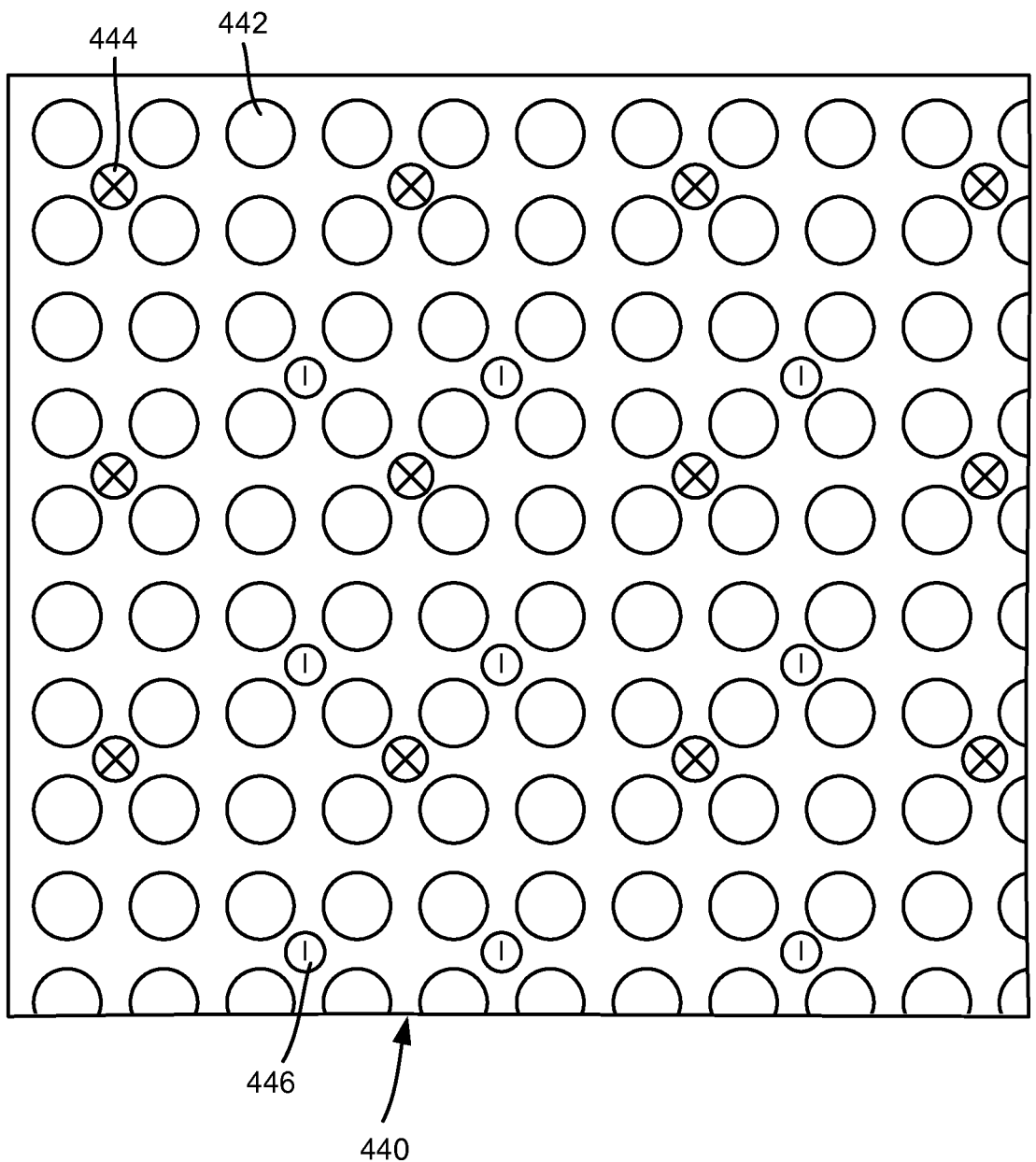
FIG. 4 is a representation of one example way in which different sensors may be co-located, according to one example embodiment.

FIG. 4 is a partial representation of pixel sensors on a chip/silica 440 showing one way in which the two or three types of sensors mentioned above may be co-located on the same image sensor chip/silica 440. In FIG. 4, consider that among the high-resolution pixel sensors (e.g., represented by the plain circles such as the circle labeled 442), low-resolution pixel sensors are interspersed (e.g., represented by the X'd circles such as the circle labeled 444). FIG. 4 also shows infrared pixel sensors (e.g., represented by the "I" circles such as the circle labeled 446) interspersed on the sensor chip/silica 440. Alternatively, pixel sensors may be co-located by using the same physical pixels for both low resolution and high resolution images, but only energizing a subset of the available pixels for the lower resolution image capture, for example.

In this way, a single lens may be used to capture an image, with the different sets of pixels separately energized as needed to capture the different types of images. As can be readily appreciated, FIG. 4 is only an example, and any number of patterns, ratios of the sensor types and so forth may be used in alternative implementations. Further, note that if infrared sensing is not occurring, or not occurring on the same chip, the infrared pixel sensors may be omitted.

Figure 5A:
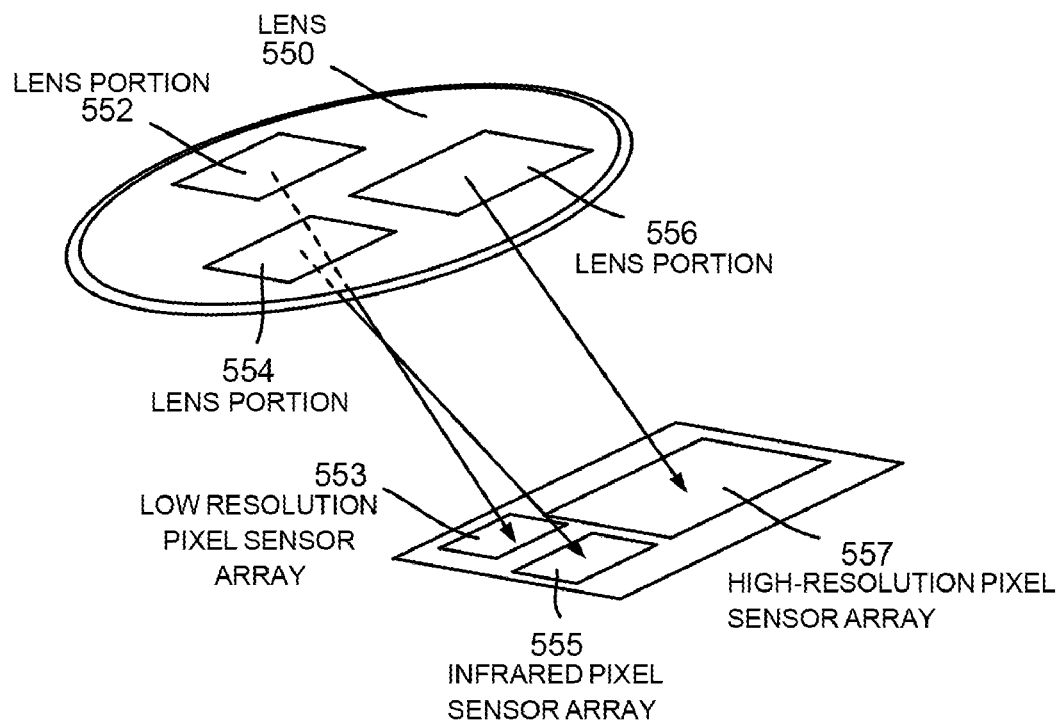
FIG. 5A is a representation of one example way in which lens mechanisms may direct light to different sensors, according to one example embodiment.

FIG. 5A is an approximate representation of another alternative, in which a lens 550 has different lens mechanisms thereon that direct light to different types of sensors. For example, the lens portion 552 may direct visible light to a low resolution pixel sensor array 553, the lens portion 554 may direct infrared light to an infrared pixel sensor array 555, and the lens portion 556 may direct visible light to a high-resolution pixel sensor array 557. As can be readily appreciated, instead of having different portions of a lens separately directing light, a lens mechanism comprising microlenses or the like may be employed that similarly direct light to an appropriate location on a corresponding sensor array.

Figure 5B:
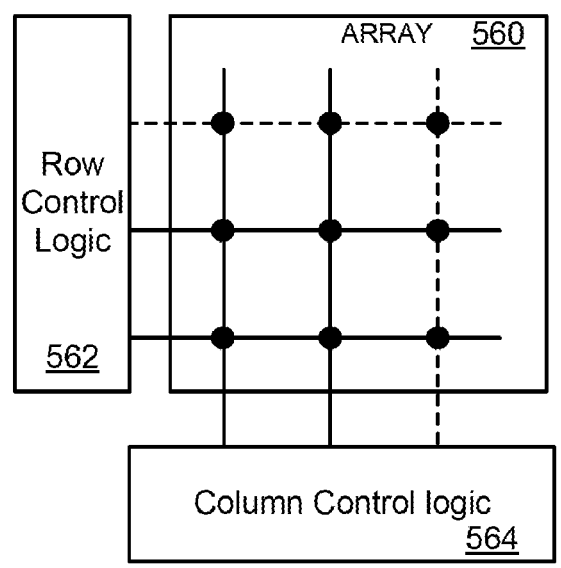
FIG. 5B is a representation of an example way in which a sensor array may be selectively energized to capture pixel data, according to one example embodiment.

FIG. 5B shows another alternative, in which individual rows and columns of an array 560 may be separately energized by row control logic 562 and/or column control logic 564. Thus, for example, a lower resolution image may be captured by energizing less than all pixels. Further, this configuration allows for windowing of a high resolution image.

Note that the concepts described in FIGS. 4, 5A and 5B may be combined, e.g., a lens mechanism (e.g., as in FIG. 4 or via microlenses) may direct a low-resolution image to a corner or some other smaller energized portion of a high-resolution array (as in FIG. 5B) that a different lens portion covers in its entirety when high-resolution windowing is desired. Note further that FIGS. 4, 5A and 5B are only examples, and that other ways to combine lenses and/or pixel sensors are feasible.

Figure 6:
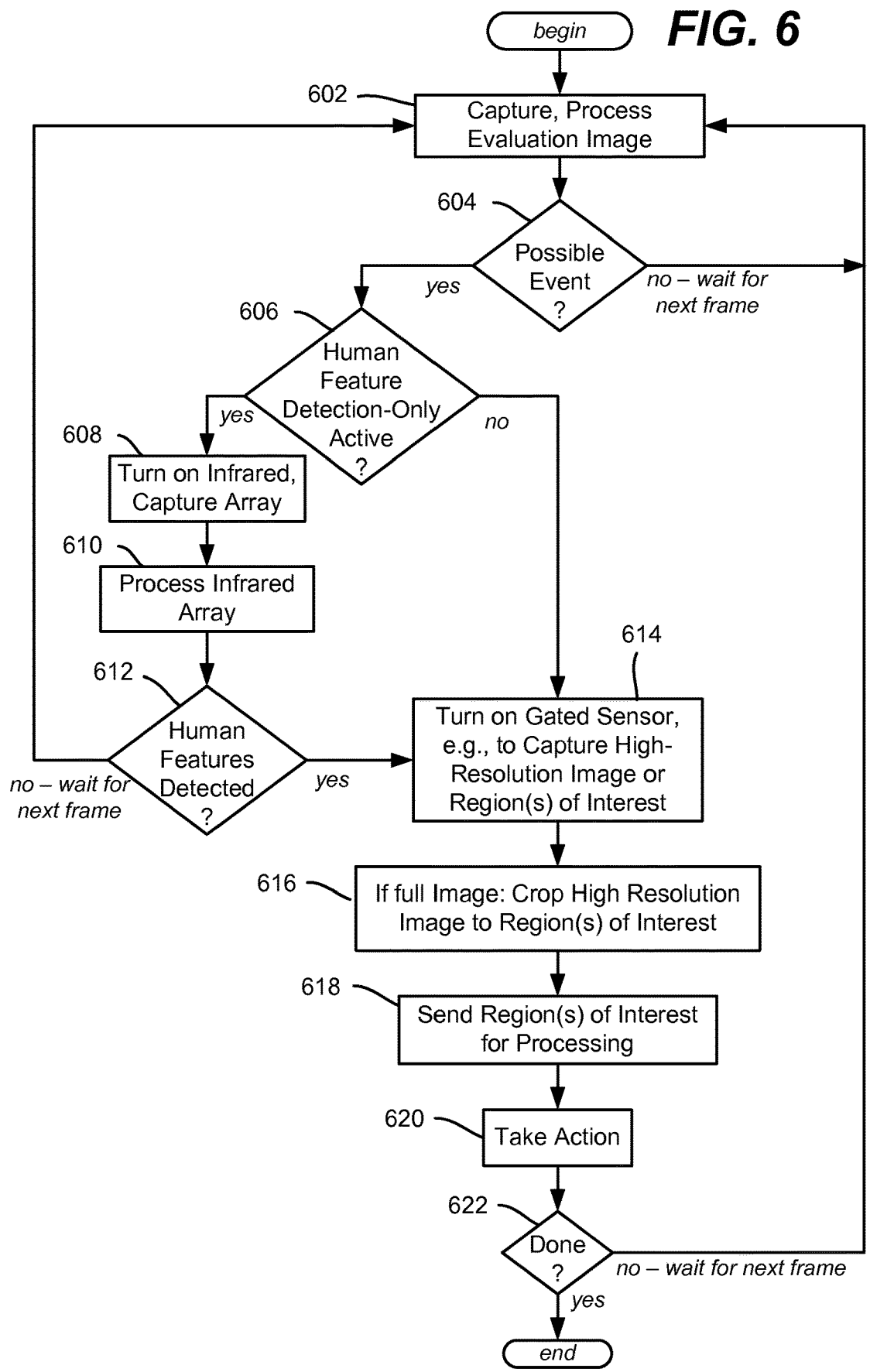
FIG. 6 is a flow diagram showing example steps that may be taken to capture one or more regions of interest corresponding to an event, according to one example embodiment.

FIG. 6 is a flow diagram showing example steps that may be taken to selectively capture only interesting image portions for processing. As is understood, the steps of FIG. 6 are only examples, and, for example, some may be omitted and/or these steps may be augmented with additional steps depending on a desired result.

Sep 602 represents capturing and processing the evaluation (gating) image, e.g., to detect the occurrence of a possible event, such as using edge detection, motion detection, image subtraction, infrared sensing and/or other techniques as described above. Step 604 repeats the evaluation image capturing and processing until a possible event is detected.

If a possible event is detected, step 606 represents determining whether the system is configured for human detection, e.g., the user has configured a setting to look for human features as opposed to other types of events; that is, not only does the criteria for capturing a high-resolution image include detection of a possible region of interest, but also whether human features are likely present. If human feature detection is active, step 608 represents turning on the infrared sensor and capturing the infrared (thermal) array. Step 610 processes the array, e.g., to determine if human-feature temperatures are present as evaluated at step 612.

If human-feature temperatures are detected, step 612 branches to step 614 to turn on the gated sensor, which in this example captures a high-resolution image (or window(s) therein). Note that step 606 also may branch to step 614 if human feature detection is not active at step 606, (or if an implementation does not have infrared sensing, e.g., as in FIG. 1, although the example of FIG. 1 may be easily adapted for infrared sensing).

Step 614 turns on the gated sensor and in this example, captures a full high-resolution image (if windowing is not available), or one or more regions of interest (if windowing is available). Note that the evaluation image, and/or the infrared image, if available, can provide data that identifies each region of interest (which may include some extra rows and/or columns of pixels surrounding the region to provide a buffer/processing context). If windowing is not available, step 616 is performed to crop the full image to the region or regions of interest.

Step 618 represents sending the data comprising the region or regions of interest for image processing. This may be to a local image processor, or a remote image processor external to the sensor/controller circuitry.

Step 620 represents taking some action as a result of the image processing. Note that "no action" may be taken, e.g., if the image processing does not recognize a particular person that it is programmed to find, for example, then nothing needs to be done.

Step 622 repeats the process until done, e.g., the user turns off the device. Note that if the action is to take a high-resolution video, at least some of the steps exemplified in FIG. 6 may still continue, e.g., to shut off the video when a person of interest is no longer in view.

As can be seen, unlike conventional image systems that have significant system workload/system energy consumption, the technology described herein reduces energy consumption by processing only the (typically small fraction of) captured image frames that are likely to contain interesting events. Further, the image sensing system described herein need not transmit and/or process a full image, but rather only the region or regions of the image field of view that contain the event of interest, and indeed in some implementations may only initially capture those one or more regions of interest.

Example Operating Environment

As mentioned, advantageously, the techniques described herein can be applied to any device, such as to provide parameters to the image sensing circuitry. It can be understood, therefore, that handheld, portable and other computing devices and computing objects of all kinds including multi-component configurations (that include a display component for example) are contemplated for use in connection with the various embodiments. Accordingly, the below general purpose remote computer described below in FIG. 7 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 7:
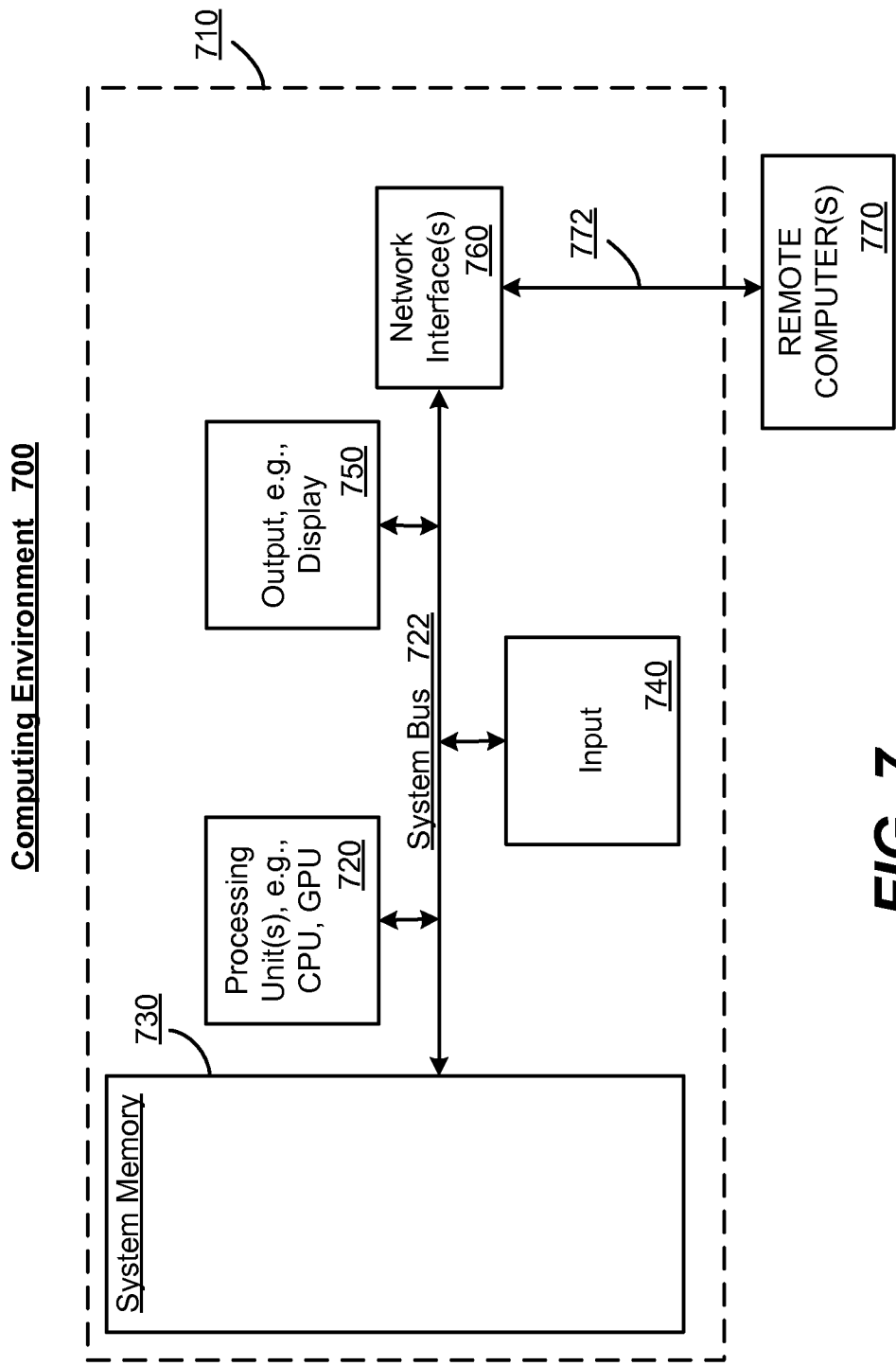
FIG. 7 is a block diagram representing an example computing environment into which aspects of the subject matter described herein may be incorporated.

FIG. 7 thus illustrates an example of a suitable computing system environment 700 in which one or more aspects of the embodiments described herein can be implemented, although as made clear above, the computing system environment 700 is only one example of a suitable computing environment and is not intended to suggest any limitation as to scope of use or functionality. In addition, the computing system environment 700 is not intended to be interpreted as having any dependency relating to any one or combination of components illustrated in the example computing system environment 700.

With reference to FIG. 7, an example remote device for implementing one or more embodiments includes a general purpose computing device in the form of a computer 710. Components of computer 710 may include, but are not limited to, a processing unit 720, a system memory 730, and a system bus 722 that couples various system components including the system memory to the processing unit 720.

Computer 710 typically includes a variety of computer-readable media and can be any available media that can be accessed by computer 710. The system memory 730 may include computer storage media in the form of volatile and/or nonvolatile memory such as read only memory (ROM) and/or random access memory (RAM). By way of example, and not limitation, system memory 730 may also include an operating system, application programs, other program modules, and program data.

A user can enter commands and information into the computer 710 through input devices 740. A monitor or other type of display device is also connected to the system bus 722 via an interface, such as output interface 750. In addition to a monitor, computers can also include other peripheral output devices such as speakers and a printer, which may be connected through output interface 750.

The computer 710 may operate in a networked or distributed environment using logical connections connected through a network interface 760 to one or more other remote computers, such as remote computer 770. The remote computer 770 may be a personal computer, a server, a router, a network PC, a peer device or other common network node, or any other remote media consumption or transmission device, and may include any or all of the elements described above relative to the computer 710. The logical connections depicted in FIG. 7 include a network 772, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method comprising:
processing first data of a first set of pixels corresponding to an evaluation image captured by a gating sensor, the gating sensor being a narrow depth-of-field sensor having a first resolution;
determining to activate an infrared gated sensor based on the processing of the first data indicating that a region of interest is captured within the evaluation image;
based on the determination, activating the infrared gated sensor to obtain an image set comprising one or more images that include the region of interest, wherein the infrared gated sensor captures images that have a second resolution that is greater than the first resolution;
identifying, from the one or more images that include the region of interest, a portion of the region of interest;
based on the image set comprising one or more images obtained by the infrared gated sensor, determining to activate a second gated sensor, the second gated sensor capturing an image of only the region of interest, the image of only the region of interest having a third resolution that is greater than the second resolution; and
processing the image of only the region of interest by reading out pixels within a specified region of the image of only the region of interest.

2. The method of claim 1, wherein determining to activate the second gated sensor comprises determining that the portion of the region of interest comprises human features.

3. The method of claim 1, wherein processing the first data of the first set of pixels corresponding to the evaluation image comprises determining that one or more regions of interest exist, wherein determining whether to activate the infrared gated sensor comprises determining that the infrared gated sensor is to be activated, and wherein activating the infrared gated sensor to obtain the image set comprises capturing the one or more regions of interest in the image set.

4. The method of claim 3, wherein capturing the one or more regions of interest in the image set comprises:
capturing a full image at higher resolution; and
cropping the full image into at least one cropped image.

5. The method of claim 3, wherein capturing the one or more regions of interest in the image set comprises controlling the infrared gated sensor to capture at least one window within a larger field of view.

6. The method of claim 1, wherein the infrared gated sensor is an infrared sensor, and wherein activating the infrared gated sensor to obtain the image set comprises capturing an image representative of temperature data for processing to determine one or more of the following: whether a region of interest exists, and whether human features exist.

7. The method of claim 1, wherein the second gated sensor comprises one or more of the following: multi-resolution and energy proportional windowing capability.

8. The method of claim 7, wherein processing the first data of the first set of pixels corresponding to the evaluation image comprises determining that one or more human features exist, wherein determining whether to activate the infrared gated sensor comprises determining that the infrared gated sensor is to be activated.

9. The method of claim 1, wherein the first set of pixels corresponds to a first set of pixel sensors co-located with other pixel sensors, and further comprising, capturing the first data of the first set of pixels by energizing the first set of pixel sensors while not energizing at least some of the other pixel sensors.

10. A system comprising:
a first sensor array configured to capture evaluation images, the first sensor array comprising a narrow depth-of-field sensor having a first resolution;
a second sensor array configured to capture another image set comprising one or more images, the second sensor array capturing images that have a second resolution that is greater than the first resolution, the second sensor array comprising an infrared sensor; and
a controller configured to process an evaluation image captured by the first sensor array to determine if one or more region-of-interest criteria are met, including whether a region of interest is present within the evaluation image, and upon determining that the one or more region-of-interest criteria are met, the controller further configured to control the second sensor array to capture the other image set to confirm a region-of-interest exists within the other image set; and
a third sensor array configure to capture an image comprising the region-of-interest based on the other image set comprising one or more images obtained by the second sensory array, the third sensor array capturing an image of only the region of interest, the image of only the region of interest having a third resolution that is greater than the second resolution;
the controller further configured to process the image of only the region of interest by reading out pixels within a specified region of the image of only the region of interest.

11. The system of claim 10, wherein the first sensor array and the second sensor array are co-located on the same image sensor, the first sensor array being interspersed among the second sensor array.

12. The system of claim 10, wherein the first sensor array has light directed thereto by a first lens mechanism, and wherein and the second sensor array has light directed thereto by a second lens mechanism.

13. The system of claim 10, wherein the one or more region-of-interest criteria comprises thermal data indicative of one or more human features within the evaluation image.

14. The system of claim 13, wherein the thermal data is sensed by the second sensor array comprising a thermopile-based far infrared image sensor mechanism.

15. The system of claim 14, wherein the first sensor array, the second sensor array, and the thermopile-based far infrared image sensor mechanism are co-located on the same image sensor, the first sensor array and the thermopile-based far infrared image sensor mechanism being interspersed among the second sensor array.

16. The system of claim 10, wherein the second sensor array comprises an array of pixel sensors having windowing capability that captures a specified area or areas within a field of view.

17. The system of claim 10, wherein the first sensor array and the second sensor array are incorporated into a wearable device.

18. One or more machine-readable storage media having executable instructions, which upon execution perform operations, comprising:
processing first data of a first set of pixels corresponding to an evaluation image captured by a gating sensor, the gating sensor being a narrow depth-of-field sensor having a first resolution;

determining to activate an infrared gated sensor based on the processing of the first data indicating that a region of interest is captured within the evaluation image;

based on the determination, activating the infrared gated sensor to obtain an image set comprising one or more images that include the region of interest, wherein the infrared gated sensor captures images that have a second resolution that is greater than the first resolution;

identifying, from the one or more images that include the region of interest, a portion of the region of interest;

based on the image set comprising one or more images obtained by the infrared gated sensor, determining to activate a second gated sensor, the second gated sensor capturing an image of only the region of interest, the image of only the region of interest having a third resolution that is greater than the second resolution; and processing the image of only the region of interest by reading out pixels within a specified region of the image of only the region of interest.

19. The one or more machine-readable storage media of claim 18, wherein:

determining to activate the second gated sensor comprises determining that the portion of the region of interest comprises human features.

20. The one or more machine-readable storage media of claim 18, wherein processing the first data of the first set of pixels corresponding to the evaluation image comprises determining that one or more regions of interest exist, wherein determining whether to activate the infrared gated sensor comprises determining that the infrared gated sensor is to be activated, and wherein activating the infrared gated sensor to obtain the image set comprises capturing the one or more regions of interest in the image set.

* * * * *